United States Patent
Ishigaki

(10) Patent No.: US 9,303,593 B2
(45) Date of Patent: Apr. 5, 2016

(54) EGR APPARATUS

(71) Applicant: DENSO CORPORATION, Kariya, Aichi-pref. (JP)

(72) Inventor: Satoshi Ishigaki, Takahama (JP)

(73) Assignee: DENSO CORPORATION, Kariya (JP)

( * ) Notice: Subject to any disclaimer, the term of this patent is extended or adjusted under 35 U.S.C. 154(b) by 342 days.

(21) Appl. No.: 13/772,967

(22) Filed: Feb. 21, 2013

(65) Prior Publication Data
US 2013/0228157 A1    Sep. 5, 2013

(30) Foreign Application Priority Data

Mar. 2, 2012 (JP) .................................. 2012-46512

(51) Int. Cl.
*F02M 25/07*    (2006.01)

(52) U.S. Cl.
CPC ........... *F02M 25/07* (2013.01); *F02M 25/0789* (2013.01); *F02M 25/0795* (2013.01); *Y02T 10/121* (2013.01)

(58) Field of Classification Search
CPC .......... F02M 25/0704; F02M 25/0715; F02M 25/0719; F02M 25/0723; F02M 25/0724; F02M 25/0773; F02M 25/0774; F02M 25/0788; F02G 2260/00; F02G 5/04
USPC ............... 123/406.48, 568.11, 568.18, 568.2, 123/568.23–568.29, 217, 406.45, FOR. 124, 123/FOR. 127
See application file for complete search history.

(56) References Cited

U.S. PATENT DOCUMENTS

| | | | | | |
|---|---|---|---|---|---|
| 5,669,364 | A | * | 9/1997 | Everingham | 123/568.18 |
| 6,089,536 | A | * | 7/2000 | Watanabe et al. | 251/129.11 |
| 6,138,652 | A | * | 10/2000 | Cook | F02M 25/0777 123/568.27 |
| 6,439,214 | B1 | * | 8/2002 | Yew | 123/568.21 |
| 2002/0174858 | A1 | * | 11/2002 | Kato et al. | 123/568.12 |
| 2003/0116743 | A1 | * | 6/2003 | Kawasaki | F02M 25/0772 251/337 |
| 2004/0099245 | A1 | * | 5/2004 | Kato et al. | 123/434 |

(Continued)

FOREIGN PATENT DOCUMENTS

| | | |
|---|---|---|
| JP | 4-252850 | 9/1992 |
| JP | 08-028735 | 2/1996 |
| JP | 2008-196437 | 8/2008 |

OTHER PUBLICATIONS

Office Action (2 pages) dated Feb. 4, 2014, issued in corresponding Japanese Application No. 2012-046512 and English translation (2 pages).

(Continued)

*Primary Examiner* — Hai Huynh
*Assistant Examiner* — Brian P Monahon
(74) *Attorney, Agent, or Firm* — Nixon & Vanderhye P.C.

(57) ABSTRACT

An arm portion is integrally formed with a housing. The arm portion protrudes from the housing in such a manner as not to be in contact with a passage-forming portion and a passage-side fastening portion. The arm portion has corner portions and a drive-side fastening portion. After a heat of EGR gas is transferred to the drive-side fastening portion, the heat is transferred to the housing through the corner portions. The arm portion elongates a heat transfer pass from the EGR gas to the driving portion to increase a resistance of heat transfer. Further, the arm portion increases a heat radiation surface area to increase a heat radiation quantity. The EGR apparatus can restrict a heat transfer from the EGR gas to the driving portion.

3 Claims, 8 Drawing Sheets

(56) References Cited

U.S. PATENT DOCUMENTS

2005/0001185 A1* 1/2005 Everingham ....... F02M 25/0773 251/69
2007/0240690 A1 10/2007 Nanba
2010/0031938 A1* 2/2010 Lim et al. ................. 123/568.17

OTHER PUBLICATIONS

Office Action (6 pages) dated Nov. 3, 2014 issued in corresponding Chinese Application No. 201310065072X and English translation (4 pages).

* cited by examiner

EGR APPARATUS

CROSS-REFERENCE TO RELATED APPLICATION

This application is based on Japanese Patent Application No. 2012-46512 filed on Mar. 2, 2012, the disclosure of which is incorporated herein by reference.

TECHNICAL FIELD

The present disclosure relates to an EGR apparatus which recirculates exhaust gas to an intake passage of an internal combustion engine.

BACKGROUND

In an exhaust gas recirculation (EGR) apparatus, it is necessary to restrict a heat transfer from a recirculating exhaust gas to a motor or a reduction gears. The recirculating exhaust gas is referred to as EGR gas, hereinafter. Japanese patent No. 4687540 (US-2007-0240690A1) describes an EGR apparatus which is provided with a housing and a nozzle. The housing accommodates a motor and reduction gears. The nozzle forms a passage for EGR gas with the housing and has a valve body. An air layer is formed between the nozzle and the housing. The air layer restricts a heat transfer from the EGR gas to the motor and the reduction gears.

In a case that a valve body is arranged upstream of an EGR gas cooler in order to accelerate a softening of solidified deposits around the valve body, the EGR gas of high temperature flows through the passage, so that a temperature difference between the EGR gas and the housing becomes larger. As a result, it is likely that heat quantity transferred from the EGR gas to the motor and the reduction gears through the housing is increased.

FIG. 10 shows a part of a conventional EGR apparatus 100 which is provided with a driving portion 101 and a passage-forming portion 102. The driving portion is comprised of a housing which accommodates a motor and reduction gears. The passage-forming portion 102 defines a passage for EGR gas and accommodates a valve body. The driving portion 101 and a passage-forming portion 102 are fastened by a bolt 103.

A heat insulating material 106 is arranged between a passage-side fastening portion 104 of the driving portion 101 and a drive-side fastening portion 105 of the passage-forming portion 102. The heat insulating material 106 restricts a heat transfer from the EGR gas to the driving portion 101 through the passage-forming portion 102. However, the heat insulating material 106 is not always enough to restrict the heat transfer.

SUMMARY

It is an object of the present disclosure to provide an EGR apparatus comprised of a driving portion and a passage-forming portion, which is able to restrict a heat transfer from an EGR gas to the driving portion.

According to an aspect of the present disclosure, an EGR apparatus is provided with a passage-forming portion, a driving portion, a passage-side fastening portion and an arm portion. The passage-forming portion has a space defining a part of an EGR passage through which the exhaust gas is recirculated to the intake passage. The space accommodates a valve body which opens/closes the EGR passage. The driving portion is arranged in such a manner as not to be in contact with the passage-forming portion. The driving portion generates a driving force to drive the valve body.

The passage-side fastening portion is a part of a fastening portion for fastening the passage-forming portion and the driving portion by means of a fastening member. The passage-side fastening portion is formed integrally with the passage-forming portion. The arm portion is formed integrally with the driving portion. The arm portion protrudes from the driving portion in such a manner as not to be in contact with the passage-forming portion and the passage-side fastening portion. The arm portion has a first corner portion, a second corner portion and a drive-side fastening portion. The drive-side fastening portion is a part of the fastening portion. The drive-side fastening portion is fastened to the passage-side fastening portion through a heat insulating layer.

When the EGR gas flows in the space, the heat of the EGR gas is transferred from the passage-forming portion to the driving portion through the passage-side fastening portion, the heat insulating layer and the arm portion. In the arm portion, after the heat of the EGR gas is transferred from the heat insulating layer to the drive-side fastening portion, the heat is transferred to the driving portion through the corner portions. The arm portion elongates a heat transfer pass from the EGR gas to the driving portion to increase a resistance of heat transfer. Further, the arm portion increases a heat radiation surface area to increase a heat radiation quantity. According to the above configuration, an EGR apparatus is able to restrict a heat transfer from an EGR gas to the driving portion.

According to another aspect of the present disclosure, an EGR apparatus is provided with a passage-forming portion, a driving portion, a drive-side fastening portion and an arm portion. The drive-side fastening portion is a part of a fastening portion for fastening the passage-forming portion and the driving portion by means of a fastening member. The passage-side fastening portion is formed integrally with the driving portion. The arm portion is formed integrally with the passage-forming portion. The arm portion protrudes from the passage-forming portion in such a manner as not to be in contact with the driving portion and the drive-side fastening portion. The arm portion has corner portions and a passage-side fastening portion. The passage-side fastening portion is a part of the fastening portion. The passage-side fastening portion is fastened to the drive-side fastening portion through a heat insulating layer.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

Figure 1:
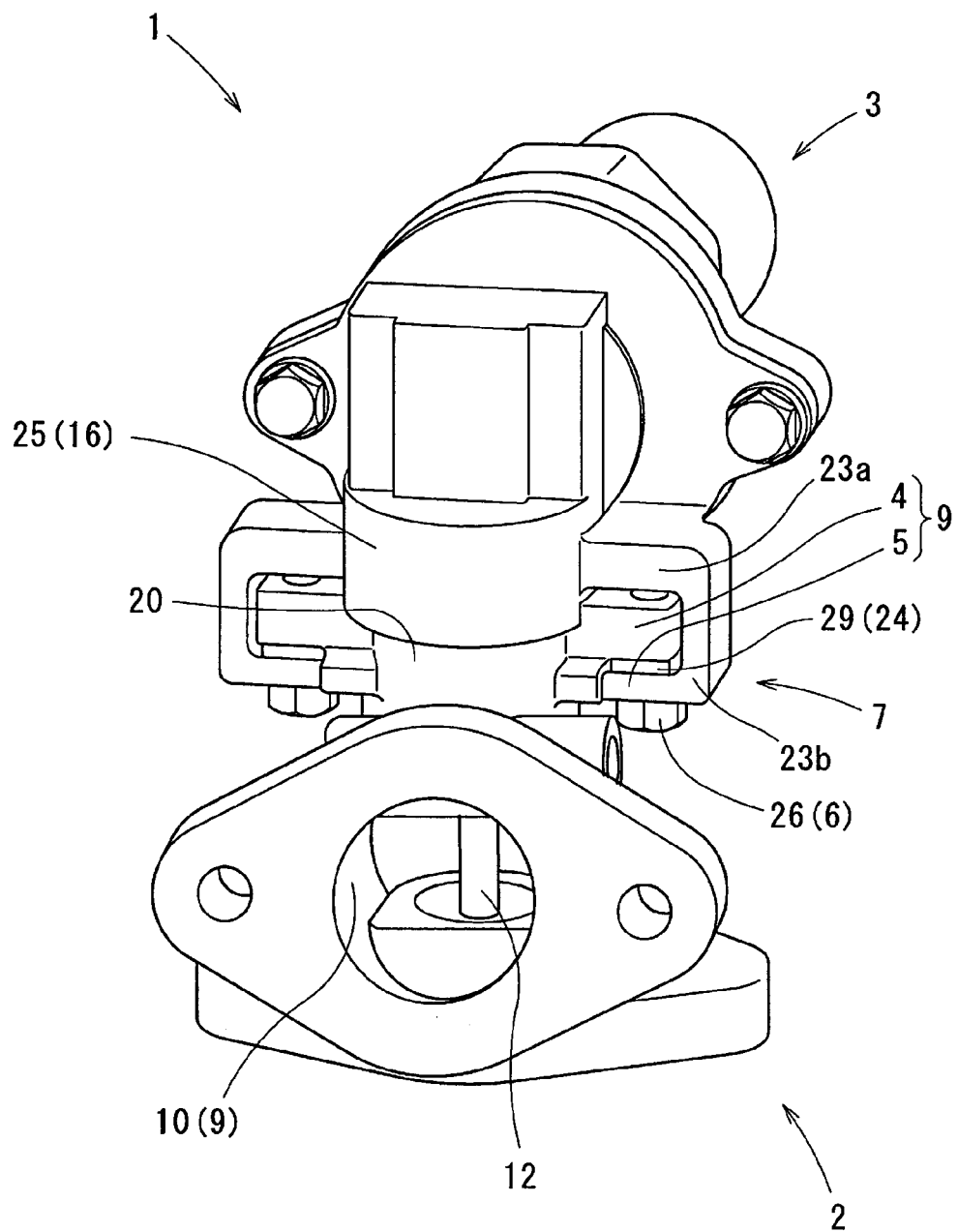
FIG. 1 is a schematic view showing an EGR apparatus according to a first embodiment.

Referring to FIGS. 1 to 5, a configuration of an EGR apparatus 1 according to a first embodiment will be described.

The EGR apparatus 1 recirculates exhaust gas to an intake passage of an internal combustion engine (not shown). The EGR apparatus 1 is comprised of a passage-forming portion 2 and a driving portion 3. The passage-forming portion 2 has a passage-side fastening portion 4 and the driving portion 3 has a drive-side fastening portion 5. The passage-side fastening portion 4 and the drive-side fastening portion are fastened by a bolt 6. In order to restrict a heat transfer from the EGR gas to the driving portion 3, the EGR apparatus has the passage-forming portions 2, the driving portion 3, the passage-side fastening portion 4, and an arm portion 7, which will be described below.

The passage-forming portion 2 has a space 10 defining a part of an EGR passage 9 through which the exhaust gas is recirculated to the intake passage. The space 10 accommodates a valve body 11 which opens/closes the EGR passage 9. The valve body 11 is connected to a shaft 12 to form a poppet valve. When the valve body 11 sits on a valve seat 13, the EGR passage 9 is closed. When the valve body 11 moves away from the valve seat 13, the EGR passage 9 is opened. The shaft 12 is axially slidably supported by a shaft bush 14.

The driving portion 3 is arranged in such a manner as not to be in contact with the passage-forming portion 2. The driving portion 3 generates a driving force to drive the valve body 11. The driving portion 3 is comprised of a motor (not shown) driving the valve body 11 in a valve-open direction, reduction gears (not shown) transmitting a driving force to the valve body 11 and a housing 16 accommodating the motor and the reduction gears therein.

A coil spring 17 is arranged between the passage-forming portion 2 and the driving portion 3. The coil spring 17 biases the valve body 11 in a valve-close direction. A first end of the coil spring 17 is supported by the passage-forming portion 2 and a second end of the coil spring 17 is supported by a spring seat 18 fixed on the shaft 12.

The passage-side fastening portion 4 is a part of a fastening portion 19 for fastening the passage-forming portion 2 and the driving portion 3 by means of the bolt 6. The passage-side fastening portion 4 is formed integrally with the passage-forming portion 2. A cylindrical portion 20 of the passage-forming portion 2 accommodates the coil spring 17. Two passage-side fastening portions 4 extend from the cylindrical portion 20 in a vertical direction relative to an axial direction of the coil spring 17 and the cylindrical portion 20. Each of the passage-side fastening portions 4 confronts each other with respect to the cylindrical portion 20, as shown in FIG. 1. Each of the passage-side fastening portions 4 has a female thread 21.

The arm portion 7 is formed integrally with the housing 16. The arm portion 7 protrudes from the housing 16 in such a manner as not to be in contact with the passage-forming portion 2 and the passage-side fastening portion 4. The arm portion has a first corner portion 23a, a second corner portion 23b and the drive-side fastening portion 5 at its end. The drive-side fastening portion 5 is a part of the fastening portion 19. The drive-side fastening portion 5 is fastened to the passage-side fastening portion 4 through a heat insulating layer 24.

Figure 2:
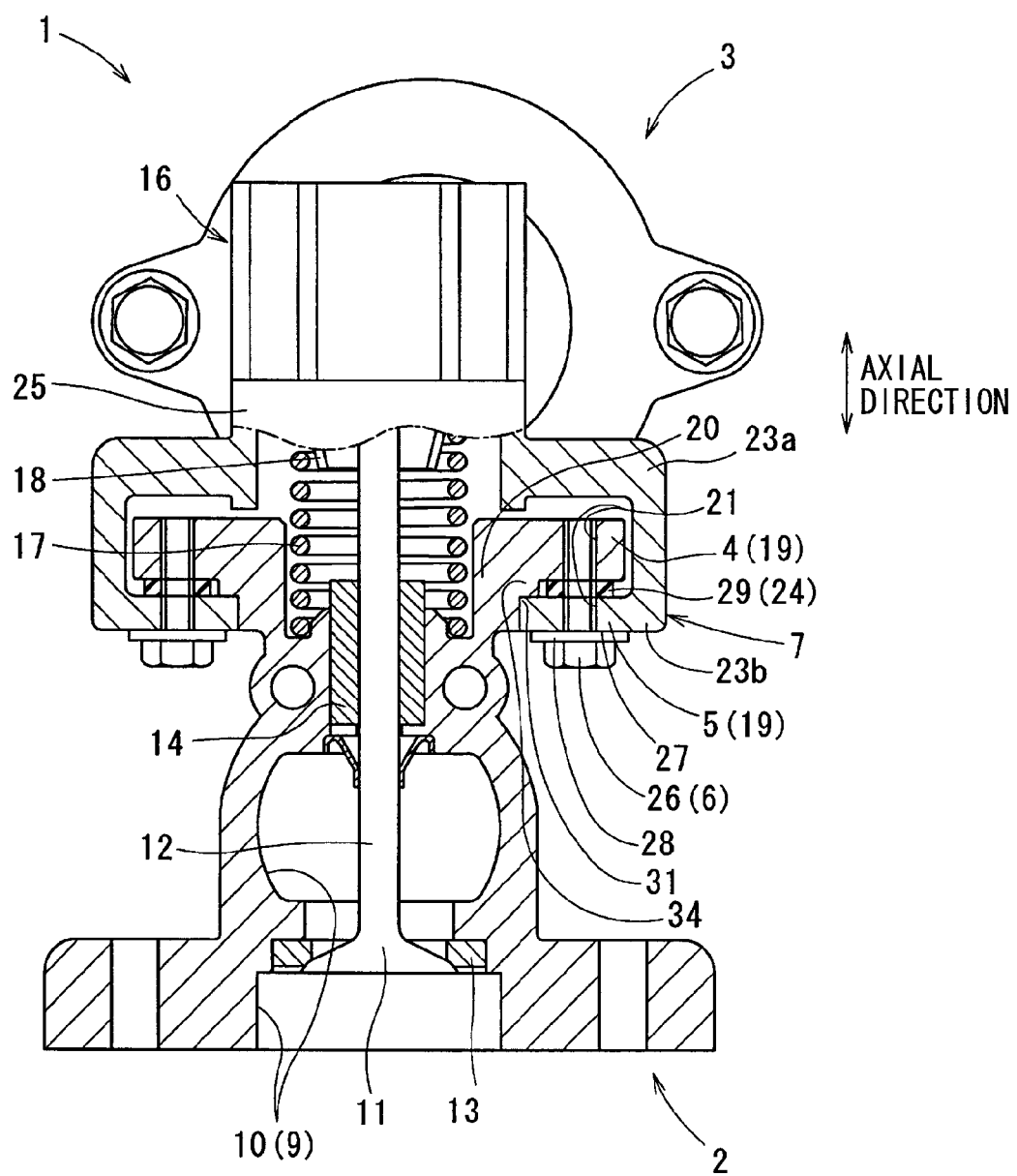
FIG. 2 is a partially sectional view showing an interior of the EGR apparatus (first embodiment)
Figure 3:
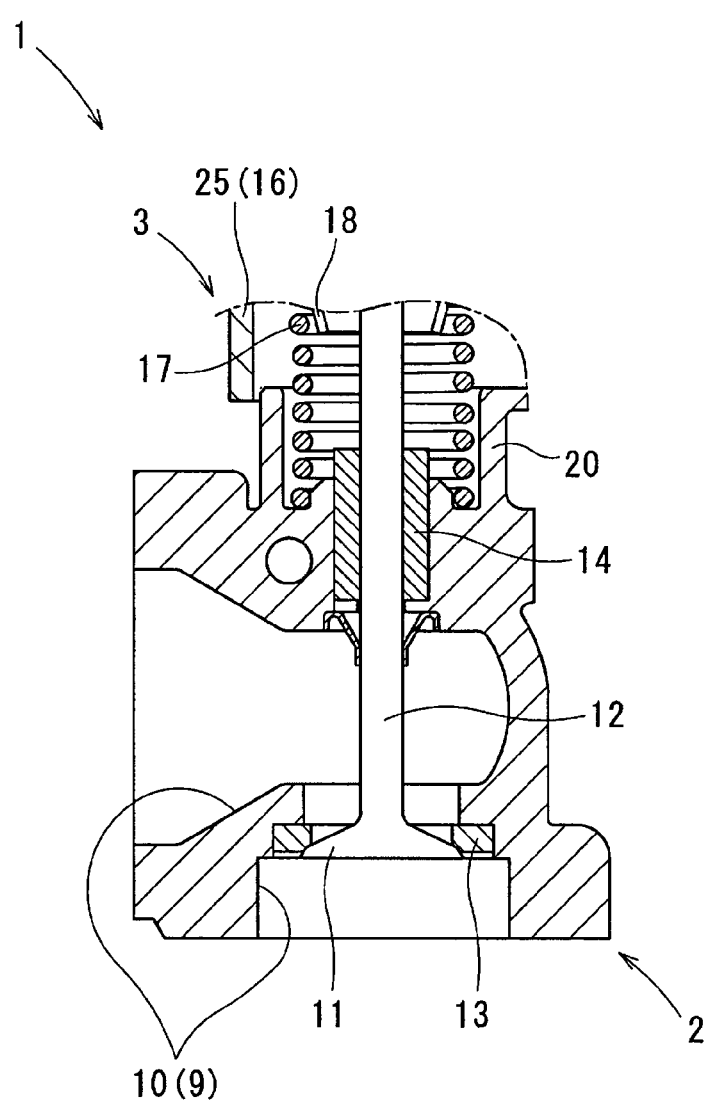
FIG. 3 is a fragmentally sectional view showing an interior of the EGR apparatus (first embodiment)

The arm portion 7 has the first corner portion 23a and the second corner portion 23b to be U-shaped, whereby each of the passage-side fastening portions 4 is surrounded by the arm portion 7, as shown in FIGS. 1 and 2. That is, the arm portion 7 protrudes radially outwardly from the housing 16 and bends at the first corner portion 23a in the axial direction. Then, the arm portion 7 bends radially inwardly at the second corner portion 23b. The drive-side fastening portion 5 is positioned radially inside of the second corner portion 23b.

The arm portion 7 protrudes radially outwardly from a cylindrical portion 25 of the housing 16 at two places which correspond to the passage-side fastening portions 4. The drive-side fastening portion 5 of the arm portion 7 has a female thread 21. Further, the drive-side fastening portion 5 has a bolt seat 27. A head 26 of the bolt 6 is brought into contact with the bolt seat 27 through a washer 28, whereby the drive-side fastening portion 5 receives fastening force.

The heat insulating layer 24 is a heat insulating material 29. The passage-side fastening portion 4 and the drive-side fastening portion 5 are fastened to each other by the bolt 6 through the heat insulating material 29 of which thickness is kept constant. The heat insulating material 29 is made of silicon sponge, for example. Also, the passage-forming portion 2 and the passage-side fastening portion 4 are made from iron alloy, such as stainless steel and cast iron. The housing 16 and the arm portion are made from aluminum alloy.

Figure 4:
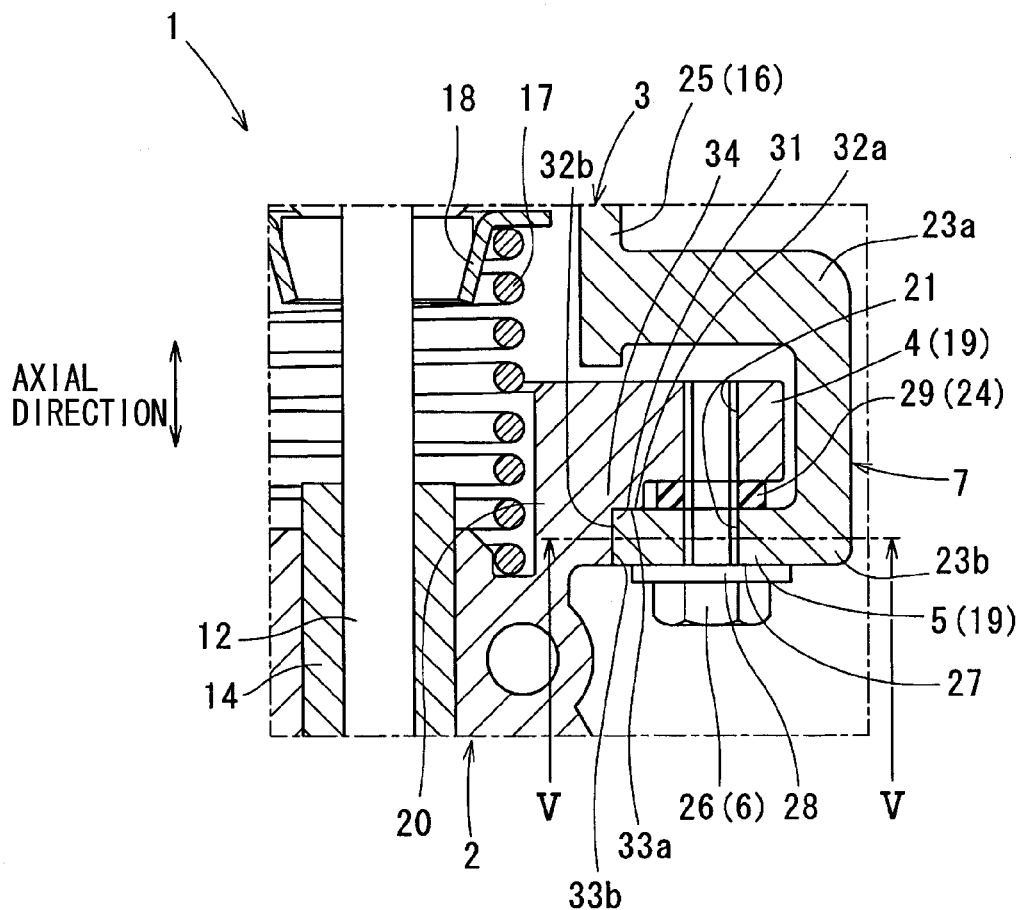
FIG. 4 is a fragmentally sectional view showing an essential interior part of the EGR apparatus (first embodiment)
Figure 5:
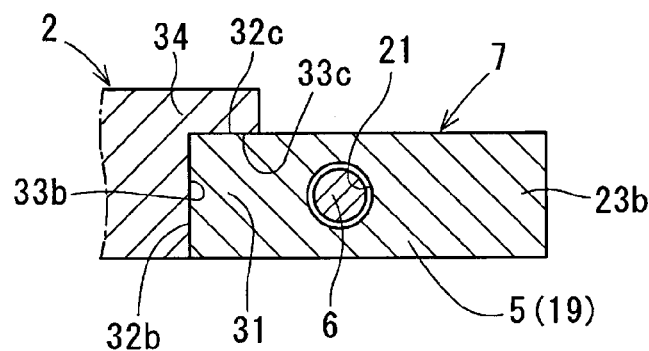
FIG. 5 is a cross-sectional view taken along a line V-V in FIG. 4 (first embodiment)
Figure 6:
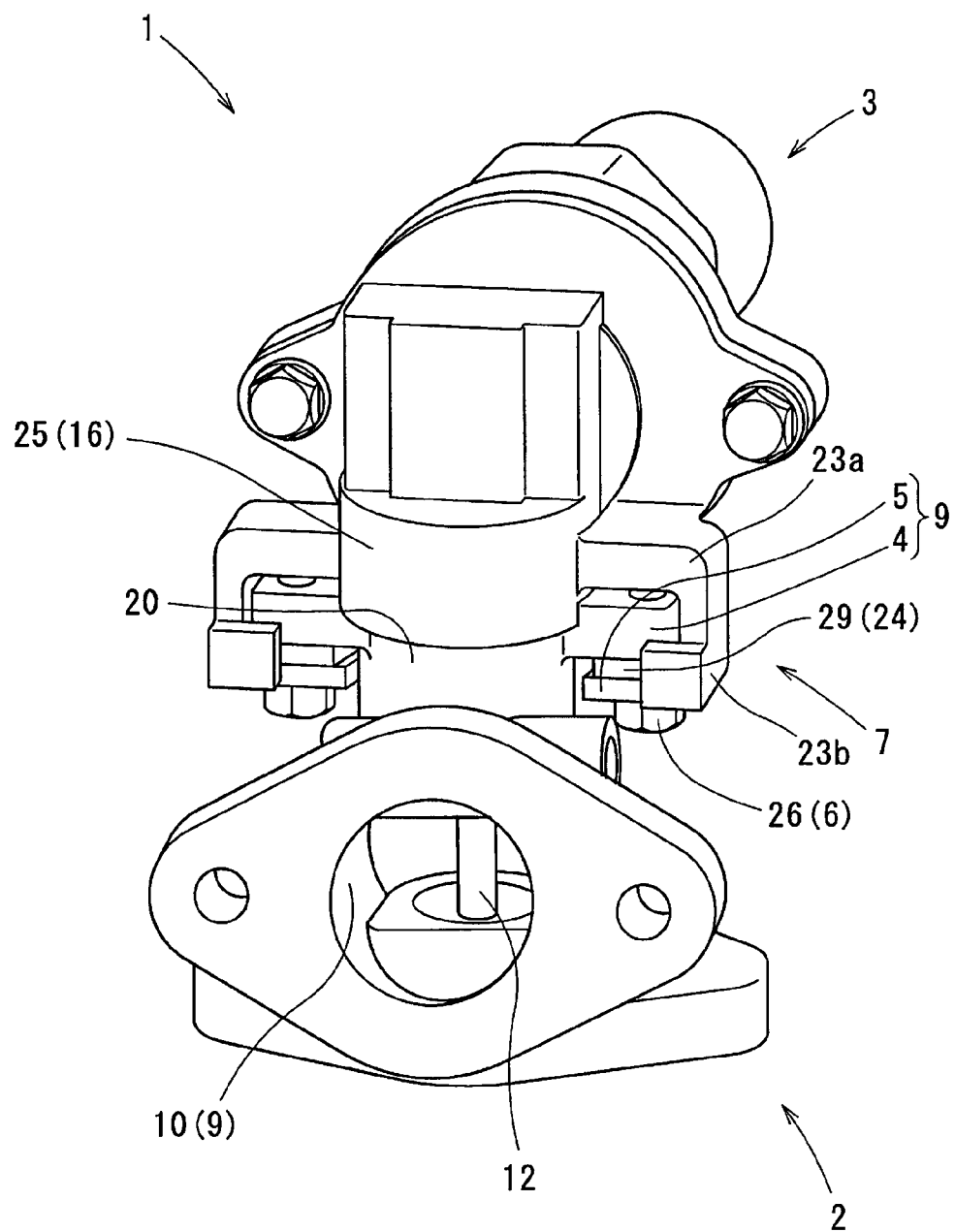
FIG. 6 is a schematic view showing an EGR apparatus according to a second embodiment.
Figure 7:
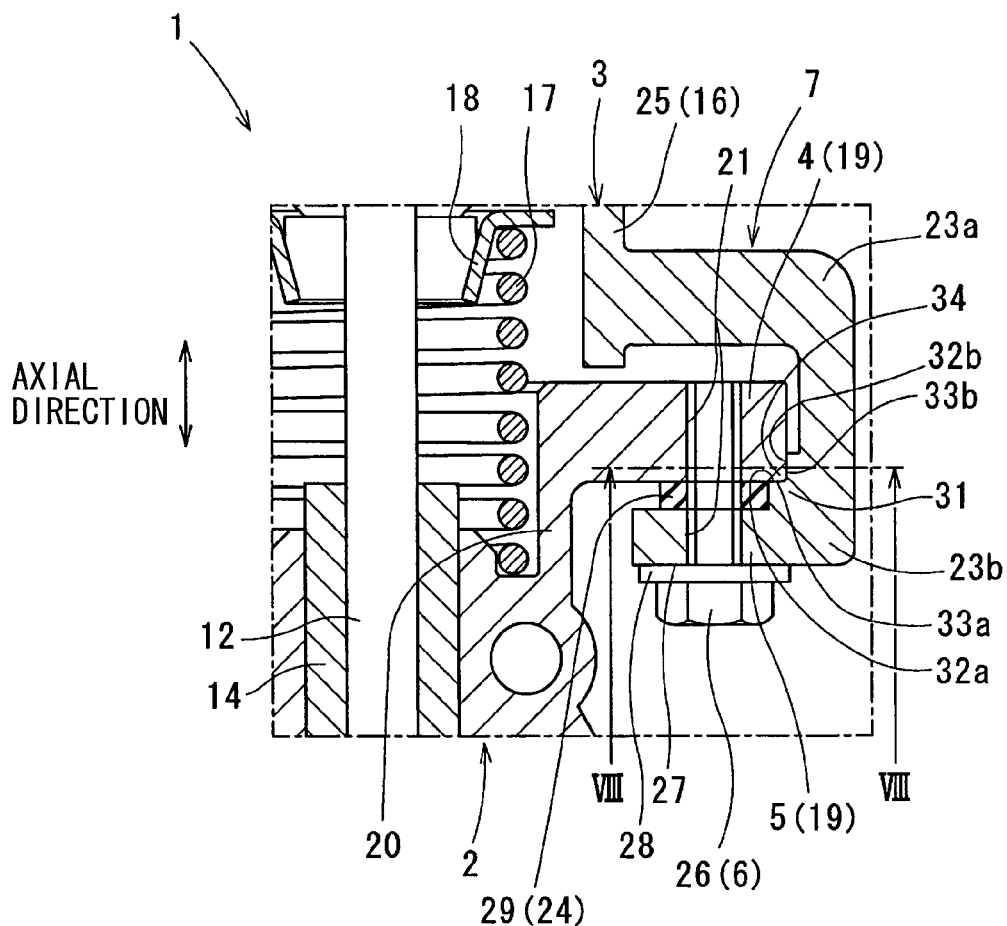
FIG. 7 is a fragmentally sectional view showing an essential interior part of the EGR apparatus (second embodiment)
Figure 8:
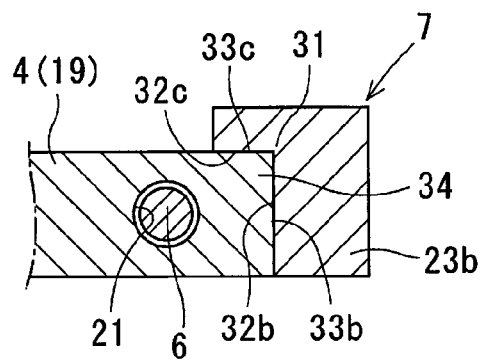
FIG. 8 is a cross-sectional view taken along a line VIII-VIII in FIG. 7 (second embodiment)

Moreover, the arm portion 7 has a contact portion 31 which is brought into contact with the passage-forming portion 2. The contact portion 31 is formed at a tip end of the arm portion 7. The contact portion 31 is comprised of three contact surfaces 32a, 32b and 32c which are mutually vertical, as shown in FIGS. 4 and 5. The first contact surface 32a is vertical to the axial direction, and the second contact surface 32b is parallel to the axial direction. Moreover, the passage-forming portion 2 has three receiving surfaces 33a, 33b and 33c with which the three contact surfaces 32a, 32b and 32c are brought into contact respectively.

A receiving portion 34 having the receiving surfaces 33a, 33b and 33c are integrally formed with the cylindrical portion 20. The contact surfaces 32a, 32b and 32c are convexed and the receiving surfaces 33a, 33b and 33c are concaved, whereby the contact portion 31 and the receiving portion 34 are engaged with each other.

Furthermore, the passage-side fastening portion 4 and the drive-side fastening portion 5 are fastened to each other by the bolt 6, whereby the first contact surface 32a and the first receiving surface 33a are in surface-contact with each other by large axial force. That is, the contact portion 31 is pressed to the receiving portion 34 in a thickness direction of the heat insulating material 29.

Advantages of First Embodiment

When the EGR gas flows in the space 10, the heat of the EGR gas is transferred from the passage-forming portion 2 to the housing 16 through the passage-side fastening portion 4, the heat insulating layer 24 and the arm portion 7. In the arm portion 7, after the heat of the EGR gas is transferred from the heat insulating layer 24 to the drive-side fastening portion 5, the heat is transferred to the housing 16 through the corner portions 23a, 23b.

The arm portion 7 elongates a heat transfer pass from the EGR gas to the driving portion 3 to increase a resistance of heat transfer. Further, the arm portion 7 increases a heat radiation surface area to increase a heat radiation quantity. As above, the EGR apparatus 1 can restrict a heat transfer from the EGR gas to the driving portion 3.

Moreover, the arm portion 7 has the contact portion 31 at the end of the second corner portion 23b. Thereby, the passage-forming portion 2 and the driving portion 3 can be positioned at proper positions. By contacting the passage-forming portion 2 with the arm portion 7 at the contact portion 31, a heat transfer pass is generated without through the heat insulating layer 24.

However, since a contacting surface for positioning is not large, the heat transfer quantity from the passage-forming portion 2 to the arm portion 7 through the contact portion 31 does not become large. Moreover, since the drive-side fastening portion 5 and the corner portions 23a, 23b are positioned downstream of the contact portion 31 in a heat flow, a portion where the resistance of heat transfer is large and a heat radiation surface area is large can be ensured. Therefore, it is surely restricted that the heat is transferred to the driving portion 3 through the contact portion 31 and the arm portion 7.

In a contacting portion between the contact portion 31 and the receiving portion 34, since three contact surfaces 32a to 32c are in contact with three receiving surfaces 33a to 33c respectively, the passage-forming portion 2 and the driving portion 3 can be more certainly positioned at proper positions.

Furthermore, the heat insulating layer 24 is a heat insulating material 29. The passage-side fastening portion 4 and the drive-side fastening portion 5 are fastened to each other by the bolt 6 through the heat insulating material 29 of which thickness is kept constant. The contact portion 31 is pressed to the passage-forming portion 2 in the thickness direction of the heat insulating material 29. Thereby, even if a creep occurs in the heat insulating material 29, it can be restricted that a fastening force of the bolt 6 is decreased.

Second Embodiment

In a second and the successive embodiments, the same parts and components as those in the first embodiment are indicated with the same reference numerals and the same descriptions will not be reiterated.

According to an EGR apparatus 1 of the second embodiment, the receiving portion 34 is formed at an axial end of the passage-side fastening portion 4. The contact portion 31 is formed at substantially the same position as the second corner portion 23b in such a manner as to surround the receiving portion 34. The contact surfaces 32a, 32b and 32c are convexed and the receiving surfaces 33a, 33b and 33c are concaved, whereby the contact portion 31 and the receiving portion 34 are engaged with each other. The contact surfaces 32a and 32b are positioned inside of the second corner portion 23b.

Even in a case that the contact portion 31 and the receiving portion 34 are arranged as above, since the first corner portion 23a is positioned downstream of the contact portion 31 in a heat flow without through the heat insulating layer 24, a portion where the resistance of heat transfer is large and a heat radiation surface area is large can be ensured. Therefore, it is surely restricted that the heat is transferred to the driving portion 3 through the contact portion 31 and the arm portion 7.

Third Embodiment

Figure 9:
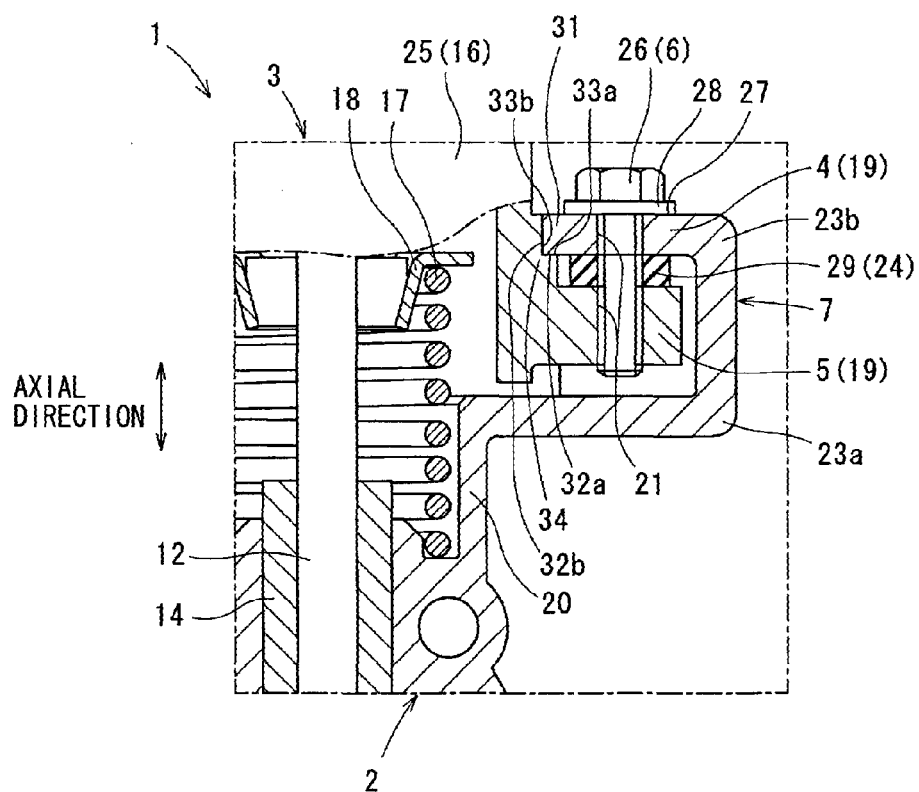
FIG. 9 is a fragmentally sectional view showing an essential interior part of the EGR apparatus according to a third embodiment.
Figure 10:
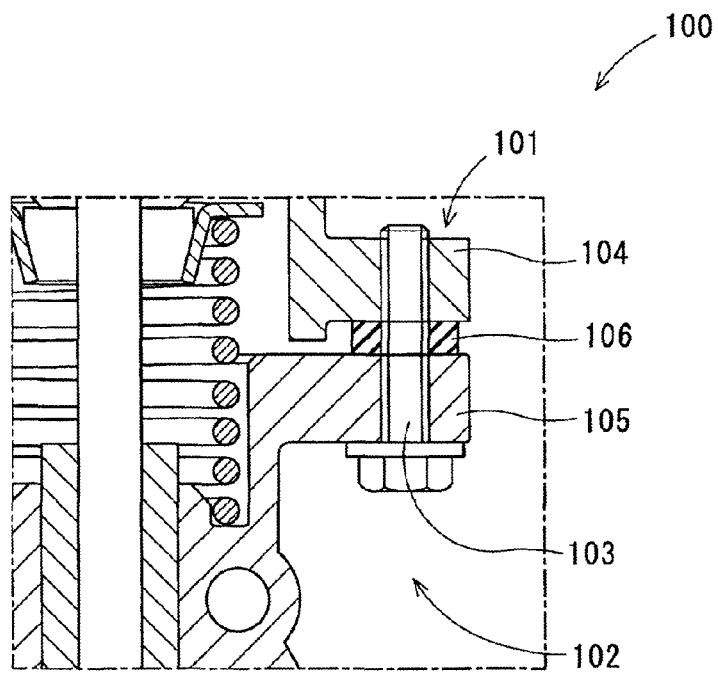
FIG. 10 is a fragmentally sectional view showing an essential interior part of a conventional EGR apparatus.

According to a third embodiment, as shown in FIG. 9, the drive-side fastening portion 5 radially extends from the cylindrical portion 25 at two places. Each of the drive-side fastening portions 5 has the female thread 21.

The arm portion 7 is integrally formed with the passage-forming portion 2. The arm portion 7 protrudes from the passage-forming portion 2 in such a manner as not to be in contact with the housing 16 and the drive-side fastening portion 5. The arm portion 7 has the first corner portion 23a, a second corner portion 23b and the passage-side fastening portion 4 at its end. The passage-side fastening portion 4 and the drive-side fastening portion 5 are fastened to each other by the bolt 6 through the heat insulating material 29.

The arm portion 7 has the first corner portion 23a and the second corner portion 23b to be U-shaped, whereby each of the drive-side fastening portions 5 is surrounded by the arm portion 7. That is, the arm portion 7 protrudes radially outwardly from the passage-forming portion 2 and bends at the first corner portion 23a in the axial direction. Then, the arm portion 7 bends radially inwardly at the second corner portion 23b. The passage-side fastening portion 4 is positioned radially inside of the second corner portion 23b.

The arm portion 7 protrudes radially outwardly from a cylindrical portion 20 at two places which correspond to the drive-side fastening portions 5. The passage-side fastening portion 4 of the arm portion 7 has the female thread 21. Further, the passage-side fastening portion 4 has a bolt seat 27. The head 26 of the bolt 6 is brought into contact with the bolt seat 27 through the washer 28, whereby the passage-side fastening portion 4 receives fastening force.

Moreover, the arm portion 7 has a contact portion 31 which is brought into contact with the housing 16. The contact portion 31 has the contact surfaces 32a, 32b and 32c. The housing 16 has the receiving surfaces 33a, 33b and 33c. The contact surfaces 32a, 32b and 32c are convexed and the receiving surfaces 33a, 33b and 33c are concaved, whereby the contact portion 31 and the receiving portion 34 are engaged with each other.

[Modification]

The EGR apparatus 1 may not have the contact portion 31. The passage-forming portion 2 and the driving portion 3 can be properly positioned by other construction.

The heat insulating layer 24 may be formed by an air layer instead of the heat insulating material 29. The valve body 11 may be configured as a butterfly valve.

What is claimed is:

1. An EGR apparatus comprising:
 a passage-forming portion which has a space defining a part of an EGR passage through which an exhaust gas is recirculated to an intake passage, the space accommodating a valve body which opens/closes the EGR passage;
 a driving portion which is arranged in such a manner as not to be in contact with the passage-forming portion, the driving portion generating a driving force to drive the valve body;
 a passage-side fastening portion which is integrally formed with the passage-forming portion and corresponds to a part of a fastening portion for fastening the passage-forming portion and the driving portion by means of a fastening member; and
 an arm portion which protrudes from the driving portion and has a first corner portion and a second corner portion in such a manner as not to be in contact with the passage-forming portion and the passage-side fastening portion, the arm portion having a drive-side fastening portion which is a part of the fastening portion and is fastened to the passage-side fastening portion through a heat insulating layer, wherein the valve body is connected to a shaft to form a poppet valve, and the arm portion is U-shaped by the first corner portion and the second corner portion in such a manner as to surround the passage-side fastening portion.

2. An EGR apparatus according to claim 1, wherein:

the arm portion has a contact portion which is in contact with the passage-forming portion or the passage-side fastening portion.

3. An EGR apparatus according to claim 2, wherein:

the heat insulating layer is made of a heat insulating material;

the passage-side fastening portion and the drive-side fastening portion are fastened to each other through the heat insulating material by a fastening force of the fastening member while a thickness of the heat insulating material is kept constant; and the contact portion is pressed to the passage-forming portion or the passage-side fastening portion by the fastening force of the fastening member in a direction of the thickness of the heat insulating material.

* * * * *